Patented Nov. 10, 1953

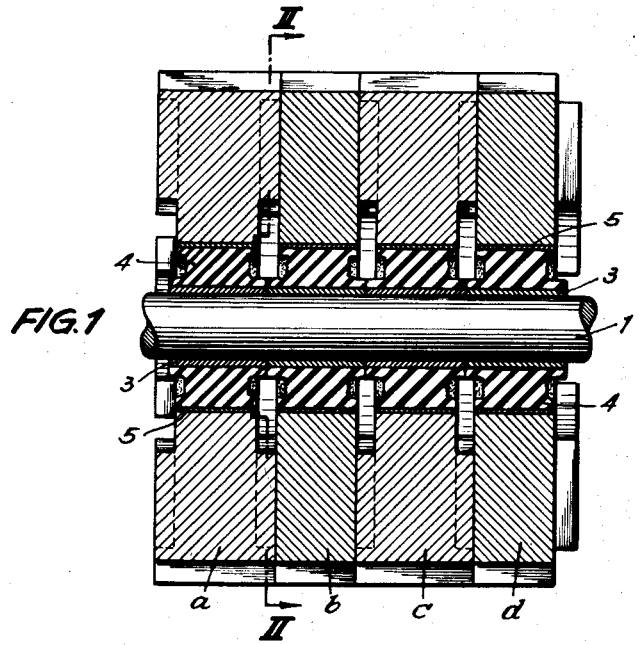
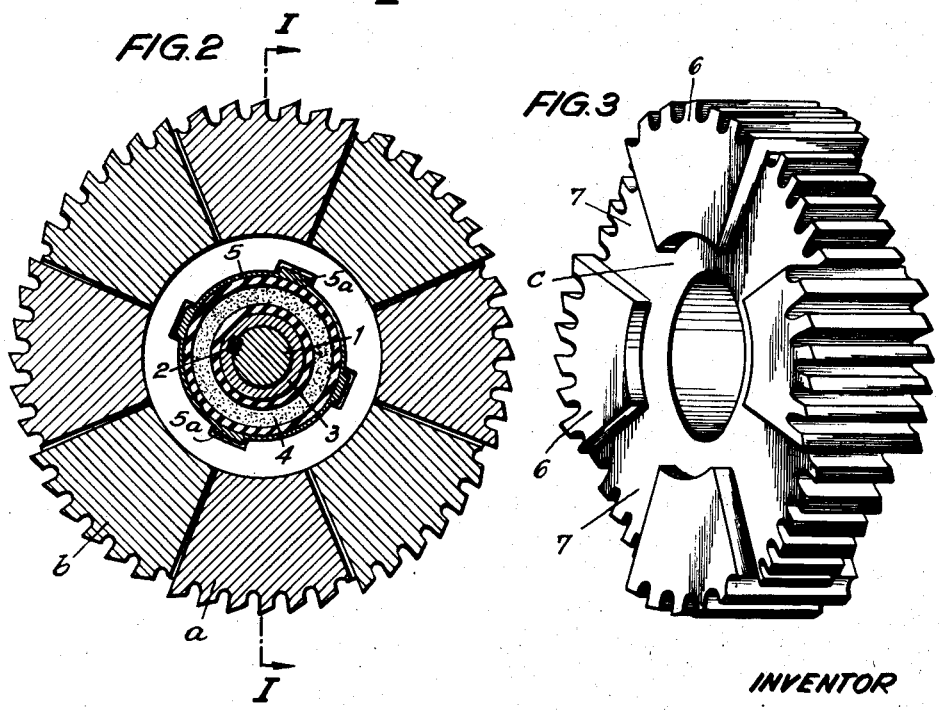

2,658,261

UNITED STATES PATENT OFFICE 2,658,261

ROTARY CUTTER

Otto Junker, Lammersdorf, near Aachen, Germany, assignor to Otto Junker, Lammersdorf, near Aachen, Germany, a corporation of Germany Application May 23, 1952, Serial No. 289,472

3 Claims. (Cl. 29—103)

For removing the casting skin of rolled metal bars cutting detaching tools are used. In some cases the casting skin is removed by a lathe, in other cases milling machines are used the cutters of which are constructed so as to extend, if possible, over the whole width of the bar. It is known to position the milling tools, especially the cylindrical cutters, stationary and to pass the work piece, i. e. the bar, along these cylindrical cutters. The stationary tools have the disadvantage that a big cutting or chip must be detached because otherwise there is no guarantee that the impurities present in recesses of the rolled surface or the bar are fully removed. It has already been suggested to suspend the cylindrical cutters like a pendulum on a lever arm and to control the pressure with which the tool is pressed against the work piece. Devices of this kind, however, are relatively complicated and therefore the intended advantage of the tools intimately engaging the roughnesses of the work piece is not fully obtained.

According to the present invention an essential improvement is obtained thereby that between an annular cylindrical body and a sleeve releasably arranged on the driving shaft an elastical intermediate layer is provided operatively coupling the mentioned two parts with each other. This intermediate layer may consist of a rubber bushing connected with the neighbouring portion by vulcanizing. It is also possible to armour the outer surface of the sleeve by a metal ring provided with coupling ledges or projections for connecting it with annular cutting disc. In the latter case the part of the whole cylindrical body provided with the cutting teeth may be exchanged alone if required by wear and tear. This special locating of the cutting discs or cylindrical body on the driving shaft considerably simplifies the whole device and allows the whole surface of the work piece to be worked in the desired manner by a plurality of cutting discs of small width arranged in an equal way the one beside the other. The individual discs follow all deepenings or elevations independently of each other and only by the elastic effect of the sleeve, i. e. the rubber bushing, so that always a cutting or chip of small height is detached and a clean surface of the work piece is attained.

The driving shaft may be stationary. Of course it may also be supported in a rockable lever in addition to electrically supporting the individual cutting discs on the driving shaft.

Cylindrical cutters consisting of a plurality of discs arranged side by side and being of a small width are known per se and are not generally a feature of the invention. In the known suggestions the cutting discs are solidly supported on the driving shaft so that all discs arranged side by side work like a solid cylinder consisting of one piece.

To avoid forming of burrs between the neighbouring cutting discs it is suggested, according to the invention, to provide the discs with axially projecting segments having cutting teeth at their circumference, said segments engaging corresponding grooves or recesses of the neighbouring disc. The clearance between the projecting segments and the grooves must be dimensioned so as to allow the discs to move radially independently of each other. It is known per se to avoid the forming of burrs by arranging a plurality of cylindrical cutters staggered relatively to, and behind each other.

The drawing shows the invention by way of example.

Fig. 1 is a longitudinal section through a cylindrical cutter consisting of several parts, according to line I—I in Fig. 2.

Fig. 2 is a section through Fig. 1 according to the line II—II.

Fig. 3 is a perspective view of a cutting disc.

In the drawing 1 designates the driving shaft, on which the cutting discs $a$, $b$, $c$ and $d$ are arranged side by side. Each disc is provided with a sleeve or bushing 3 coupled with the driving shaft by means of a wedge 2. The sleeve 3 consists of metal. Between the sleeves 3 and the cutting discs an intermediate layer 4, e. g. a rubber bushing, is inserted which may be solidly connected with the sleeve 3 by vulcanizing. The rubber sleeve 4 may be armoured, as shown in the drawing, with a metal ring, e. g. a steel rim 5, provided, at the outer surface, with ledges $5a$. The ledges serve for coupling the rim 5 with the cutting discs. The rubber bushing may, however, also be connected with the cutting discs by vulcanizing.

As to be seen especially from Fig. 3 the discs $a$, $b$, $c$ and $d$ are provided at opposite side faces with axially projecting segments 6 having cutting teeth at their outer circumference. Between these segments grooves or recesses 7 are provided, adapted to be engaged by the projections 6 of the neighbouring disc. The segments 6 and the recesses 7 are dimensioned so as to allow the neighbouring discs to move radially independently of each other. In spite of the movability of the cutting discs no burrs may remain on the work piece between the discs.

What I claim is:

1. In a device for removal of casting skins from rolled metal bars a circular milling roll composed of a plurality of circular cutter discs, a center shaft to support said cutter discs in an axially adjacent relationship, inner circular metal sleeves located upon said shaft to support said discs, a circular rubber bushing surrounding said metal sleeves, a plurality of radially orientated segmental flat projections and correspondingly formed recesses alternatingly applied to the adjacent faces of said cutter discs, cutting teeth at the outer circumference of said projecting and said recessed projections, a space being provided with said individual segmental projections of adjacent cutter discs to permit a radial mutually independent displacement thereof.

2. In a cylindrical cutter according to claim 1, a metal ring applied to the outer face of said rubber bushing and outer radial coupling studs applied to the outside of said metal ring for its connection with said discs.

3. In a cylindrical cutter according to claim 2, said circular metal sleeve said rubber bushing and said circular cutter discs being connected with each other by vulcanization.

OTTO JUNKER.

References Cited in the file of this patent

UNITED STATES PATENTS

| Number | Name | Date |
|---|---|---|
| 2,204,945 | Parker | June 18, 1940 |
| 2,295,282 | Mall | Sept. 8, 1942 |
| 2,436,466 | Wilson | Feb. 24, 1948 |
| 2,537,792 | Schloss | Jan. 9, 1951 |